Figure 1:
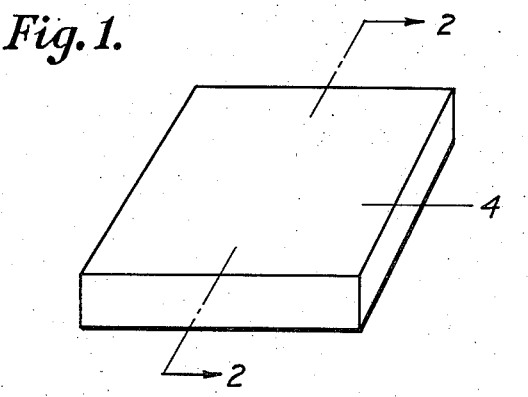

Oct. 21, 1952 — A. H. HEYROTH — 2,614,947
REFRACTORY ARTICLES AND METHOD OF MAKING
Filed Nov. 3, 1948

INVENTOR.
ALBERT H. HEYROTH
BY W. Dolan
ATTORNEY

Patented Oct. 21, 1952

2,614,947

UNITED STATES PATENT OFFICE 2,614,947

REFRACTORY ARTICLES AND METHOD OF MAKING

Albert H. Heyroth, Lewiston, N. Y., assignor to The Carborundum Company, Niagara Falls, N. Y., a corporation of Delaware Application November 3, 1948, Serial No. 58,155

10 Claims. (Cl. 117—106)

This invention relates to refractory articles of manufacture and methods of making them. More particularly, it relates to refractory articles comprising essentially a carbon body having all or selected portions of the exterior surface protected by a surface layer of refractory material which is integral with the main carbon body and is more resistant to erosion and corrosion than the main body of the article. The invention also pertains to methods of making articles of said description.

Carbon in its various forms such as in the form of graphite or amorphous carbon in many ways would constitute an ideal refractory material for many purposes, if it were not for its poor resistance to erosion and oxidation. For instance, as a lining for jet engines and rocket motors and the like it would be ideal in respect of low specific weight, low thermal conductivity and absence of a softening range or melting point. However, it has been found entirely unsatisfactory for such refractory purposes because of its failure to resist erosion by high velocity combustion gases and other elements of erosion and its avidity for oxygen at high temperatures. The problem has existed for a long time of providing a satisfactory protective coating in order to overcome the vulnerability of graphite or other carbon bodies to erosive and corrosive attack.

It is well-known that no one heretofore has succeeded in solving that problem. Extraneous coatings are known to be very poorly adherent to graphite and other carbon bodies. For instance, electroplated coatings are easily stripped from the supporting carbon surface, and ceramic coatings which have been applied to carbon bodies in an effort to protect them have checked and spalled off under fluctuating temperature conditions. In short, the extreme electrochemical inertness and thermal resistance of carbon or graphite have thus far defeated the aim of achieving satisfactory protection for carbon bodies by the application of extraneous material to the surface of the carbon or graphite body in conventional ways.

The idea has also repeatedly occurred of obtaining a protective coating on the surface of the conventional graphitic carbon or amorphous carbon bodies by subjecting those bodies to varying forms of treatment under which the carbon of that body would be converted to the conventional crystalline silicon carbide of the refractory and abrasive arts. These attempts to protect graphite or amorphous carbon bodies have been likewise unsuccessful and as far as it is known no one has ever succeeded in providing a graphite or other carbon body of any type in which the surface layers of that carbon body have been adequately and satisfactorily protected by a uniform and strongly adhered surface layer of material.

It is an object of the present invention to provide carbon bodies in which the entire exterior or selected portions thereof are protected by a surface layer of refractory material.

It is a further object of the present invention to provide a method of protecting the surface of a carbon body against erosion and corrosion at high temperatures.

It is another object to provide a protective coating for carbon bodies which will be integral therewith and strongly adherent thereto and will be substantially uniform in thickness.

Other objects and advantages of the present invention will become obvious as the description proceeds.

I have found that carbon bodies can be made in which the main carbon body is provided with an integral exterior coating or layer of protective material serving to shield the main carbon body from corrosive and erosive influences by first forming a dense carbon body meeting certain physical requirements as to density and structure and then by a brief exposure of the body to silicon vapors at high temperatures converting the surface areas of that body to a limited controlled depth to a crystalline form of silicon carbide of particular structure and crystal habit having the interstices thereof filled with a silicon or silicon-rich material, the thus formed surface layer being integral with the main carbon body or core of the original shape.

Figure 2:
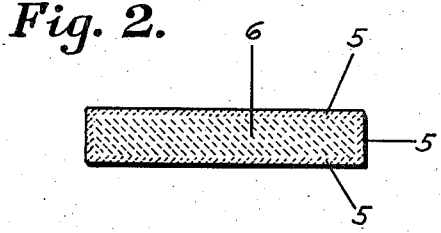
Figure 3:
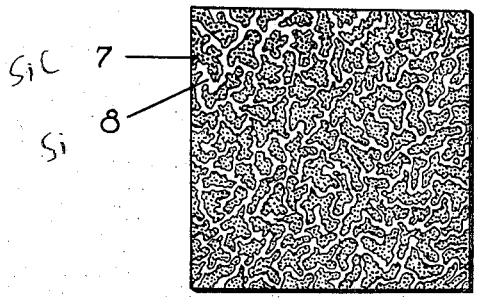

In order that the nature of the present invention may be more fully understood, reference is made to the drawing, in which Figure 1 is a perspective view of a refractory surfaced carbon block core made in accordance with the present invention;

Figure 2 is a vertical sectional view through the line 2—2 of Figure 1, and schematically shows the structure of the block as consisting of a central or core portion 6 of carbon and an integral protective layer 5 consisting of a particular structure of silicon carbide with the interstices filled with silicon or silicon-rich material; and Figure 3 is a greatly magnified view of a polished section of the material from which the protective layer 5 of the article shown in Figures 1 and 2 is composed, and graphically depicts the reticular structure of silicon carbide as the gray areas 7 and the interstitial silicon or silicon-rich material as white areas 8.

Dense carbon bodies of the type required for carrying out the present invention can be made by reacting certain kinds of carbonaceous liquid with a proper reagent in such proportions that the carbonaceous liquid releases carbon in such a manner that it entirely fills the container with a dense but reticular or skeletal reactive form of carbon which I wish to designate as chemically precipitated or atomic carbon. Not all carbonaceous liquids are suitable for this purpose; with most of them the carbon when released is precipitated as a sludge which sinks to the bottom of the residue liquid. A carbonaceous liquid admirably suited for the purpose of making bodies of the desired form of carbon is furfural or some of its derivatives such as, for example, furfuryl alcohol. Mixtures of furfural and furfuryl alcohol may also be employed. Many of the mineral acids will release the carbon from the furfural compounds, among them being hydrochloric and sulphuric acids.

When hydrochloric acid or sulphuric acid is mixed with furfural, the liberation of carbon commences at once but proceeds slowly to completion in a period ranging from 10 minutes or less to many hours, depending upon the ratio of the acid content to the furfural. This feature conveniently allows adequate time for mixing, stirring, and pouring before the congealing action has progressed beyond the fluid or "ink" stage.

When furfuryl alcohol or a mixture of furfural and furfuryl alcohol is employed and mixed with acid, the reaction proceeds in the same manner but at a faster rate. With furfuryl alcohol alone it is very rapid. When a mixture of furfural and furfuryl alcohol is used, the reaction is still faster than when furfural alone is employed, the speed of reaction in this case depending on the ratio of furfuryl alcohol to furfural. In this comparison of the speeds of reaction it is, of course, assumed that the ratio of the furfural compound or compounds to acid in the mixture is held constant.

The instant the furfural compound and the acid are stirred together, a black fluid or "ink" is formed by simultaneous release of atomic carbon in every portion of the mix. Subsequent action proceeds somewhat more slowly and operates to increase the size of and to knit together the "ink" aggregates produced during the primary reaction. During this stage of the reaction the carbon appears to "grow," much as a tremendously accelerated vegetable growth might be expected to proceed. In this manner a self-supporting carbon structure occupying the total volume of the liquid is built up, so that when the action is complete the resultant product may be likened to a wet sponge of the desired shape in which the sponge is analogous to the carbon body and the wetness to the residue of hydrochloric acid and/or the furfural compound.

The wet carbon shape is dried at a temperature high enough to drive off all moisture and other volatile matter. The shrinkage during this step is uniform in all directions and relatively small, varying slightly for different mix ratios. By the reaction above described between furfural compounds and acids, bodies consisting of 100% carbon may be produced having any desired structure varying from one imperviously dense to one having such porosity that only 5% of the total volume is carbon and 95% is air. In general, density increases with an increase in the proportion of the furfural compound in the mix.

To be suitable for siliconization of the surfaces in accordance with the present invention, leaving the core or main body of the article of carbon, by the method hereinafter described, the carbon body so produced must be relatively dense. I have found that carbon bodies so formed and having a density of between approximately .7 to 1.1 grams per cubic centimeter are highly satisfactory for purposes of the present invention. Therefore, in making carbon bodies for surface siliconization from 65% to 80% by volume of furfural compound to 35% to 20% by volume of HCl or $H_2SO_4$ of the concentrations given later herein, respectively, is ordinarily employed.

As a further means of assuring that the required density of carbon body is obtained it is found desirable to incorporate in the body certain amounts of finely divided carbon filler material to the extent of around .4 to .9 of a gram of carbon or graphite filler to each cubic centimeter of mold volume. These carbon filler materials are added to either the furfural compound or the acid employed prior to the mixture and reaction of those two materials. The particles of carbon filler are sufficiently small in size to remain suspended in substantially uniform distribution throughout the mixture until the carbon from the furfural develops sufficiently to hold them in place. Modifying liquids such as glycerine may be added to the mixture to add toughness to the resulting carbon shape so that it can be more readily handled with ordinary care without danger of breaking, particularly in the case of intricate shapes.

Although when the carbon bodies are formed from a furfural compound and a mineral acid in the specific range of proportions set forth above and embodying an added carbon filler are dense, the carbon which is provided by chemical precipitation from the furfural compound is present in a continuous skeletal form referred to herein as being of reticular structure and is highly reactive as compared to carbon bodies of like density obtained in conventional ways and composed of graphite or amorphous carbon.

Examples I and II below give typical procedures for the formation of a carbon body by the reaction of a furfural compound and an acid.

*Example I*

A carbon body suitable for surface siliconizing is made by mixing the following ingredients, the graphite filler being mixed into the acid or the furfural prior to mixing those two reactants.

Furfural _____ cc __ 65
Hydrochloric acid, commercial grade ____ cc __ 35
Finely divided graphite _____ gms __ 40

Such a mixture is poured into a mold having a cavity the shape of the desired carbon body. Reaction between the furfural and the hydrochloric acid to form the carbon structure filling the mold is completed after several hours. The wet carbon body is then removed from the mold and is ready for calcining, but may be stored for any length of time prior to calcining. The calcining step consists of heating the body in a neutral atmosphere at a temperature high enough to drive off all moisture and other volatile matter. A temperature of 1200° F. has been found sufficient to accomplish such result. The carbon body is then ready for siliconizing of the surface.

Example II

A carbon body of higher density suitable for surface siliconizing, but in which the thickness of the protective surface layer after siliconizing will not be as great, other factors in the siliconizing operation being the same, as that provided in the case of bodies made in accordance with Example I, can be made from a mixture of the following ingredients:

Furfural _____ cc__ 80
Hydrochloric acid, commercial grade_____ cc__ 20
Finely ground carbon_____ gms__ 90

The procedure is the same as that given for Example I.

Example III

A carbon body of high density suitable for surface siliconizing but in which the thickness of the protective surface layer after siliconizing will not be as great as that provided in the case of bodies made in accordance with Example I can also be made from a mixture of the following ingredients:

Furfural _____ cc__ 80
Sulphuric acid _____ cc__ 20
Finely ground carbon_____ gms__ 90

The procedure is the same as that given for Examples I and II.

In Examples I, II and III the furfural used is the ordinary commercial furfural. The concentration of the hydrochloric acid is not critical although the hydrochloric acid used was ordinary commercial, concentrated hydrochloric acid containing about 35% HCl. The sulphuric acid employed in Example III consists of 60% water and 40% commercial concentrated sulphuric acid by volume.

As has been stated above, instead of furfural, furfuryl alcohol may be used in this and similar reactions. In general, for slow setting mixes, furfural alone is used. When furfuryl alcohol alone is used, the reaction is very rapid and hard to control and the acid must be used in the dilute concentrations. For rapid setting mixes, a mixture of 96% furfural and 4% furfuryl alcohol has been found to work very well. However, any desired proportion of furfuryl alcohol may be used with furfural to obtain the desired result.

The step of calcining the dried carbon body, while commercially desirable, is not absolutely necessary since the heating upon siliconization will drive off the volatile matter from the body. It has been found best, however, to calcine the carbon body before siliconizing it, since otherwise the body is apt to be cracked by the rapid escape of the volatile matter upon siliconization.

Having provided a carbon body of the desired density and structural characteristics as described above, the surface of the body is provided with a refractory protective layer by placing the carbon body in a closed reaction chamber, such as a covered graphite crucible, together with a sufficient amount of silicon metal to "siliconize" the surface of the body to a controlled depth, and rapidly raising the temperature of the silicon and the carbon body substantially above the melting point of silicon. The term "siliconize" as used above covers all phases of physical and chemical action taking place between the silicon vapors and the surface portions of the carbon body in the development of a protective layer on the carbon body, including the reaction between the silicon vapors and the chemically precipitated carbon, whereby it and a part or all of the carbon filler are converted to a crystalline silicon carbide of reticular structure and cubic crystal habit, and further silicon enters the surface portions of the carbon body to fill the interstices in the reticular or skeletal structure of silicon carbide. The temperature of the reaction chamber is usually in the neighborhood of 2700° C. at which temperature the silicon metal vaporizes and impregnates the surface of the carbon body to react with the particular carbon structure thereof and form a silicon carbide layer of the described type.

The thickness of the silicon carbide protective layer thus formed is primarily dependent upon two factors, the density of the carbon body and the amount of silicon metal available for siliconization. As an example of the degree of surface siliconization and thickness of coating obtained, in siliconizing a carbon body made in accordance with Example II above using 4.4 grams of silicon metal for each square inch of surface of the body a uniform surface layer approximately ⅛ of an inch in thickness is provided on the carbon body.

The time for such impregnation is only a matter of seconds, and the entire heating time need not exceed from thirty seconds to one minute. The time varies according to the character of the electrical equipment used and the rate of application of current. In general a heating period of from three to five minutes is sufficient under any conditions that are suitable for carrying out the siliconization process.

It might be expected that the heating of the carbon body and the silicon by the above method from room temperature to the critical temperature, well above the melting point of silicon, at which rapid impregnation of the carbon surfaces by the silicon takes place, could be conducted at any desired rate since the heating is conducted in a closed chamber under such conditions that the carbon body would not be damaged by a large supply of oxygen. However, from a practical standpoint the heating should be conducted at a rapid rate in order to insure the vaporization of the silicon supply before substantial amounts of super-heated silicon vapor are formed due to the exothermic release of energy in the initial reaction areas where the carbon body comes in contact with the silicon liquid near its boiling point. If the temperature rise were so slow that the carbon body rested on boiling silicon for a large part of the total reaction time interval, then, during that period no coating would be formed upon the carbon body except upon the relatively small areas in contact with the liquid silicon, i. e. the tendency to produce a thick coating on the small initial reaction areas of the carbon body in direct contact with the liquid silicon at the expense of the remainder of the surface of the carbon body would be promoted.

The reaction between the silicon and the carbon body is initiated at optimum places on the carbon body where it comes in contact with the liquid silicon. However, due to the selected density of the carbon body, when the reaction has taken place to a limited depth the reaction at that point becomes more sluggish and the reacted surface zone increasingly inhibits further penetration as it increases in thickness. Consequently the reaction will not have proceeded to a great depth before its rate of propagation will become diminished, thereby allowing the input of electrical energy to super-heat the balance of the available supply of silicon and convert it to a super-heated silicon vapor. The carbon body then becomes enveloped in an atmosphere of superheated silicon vapor. The surface of the carbon body resting on the crucible bottom, upon which the initial coating has been developed, is more immune to this atmosphere than the uncoated virgin surfaces which are now under more favorable reaction conditions. Reaction will be propagated rapidly at first, then at a diminishing rate in these virgin surfaces.

In spite of the fact that the portion of the carbon body resting on the crucible bottom is reacted to a limited depth before the reaction is initiated on the remainder of the surface of the carbon body, experiments demonstrate that further reaction at the initially reacted area is retarded while at the same time the reaction rate at the still unreacted or virgin surfaces is great enough to cause the depth of reaction at those areas to equal that of the originally reacted area with the result that the final overall coating of the article is of remarkable uniformity of thickness regardless of surface contours. When the proper temperature has been reached the entire reaction is extremely rapid, the lapsed time between the beginning of the reaction and its completion being usually a matter of seconds.

In carrying out the process of the present invention by the above method it is desirable that the temperature of the article be maintained at the impregnation point or even slightly higher for a short time after the excess silicon has been volatilized, in order that the surface of the article may be smooth and free from surface-adhering silicon or silicon-containing material.

Another method by which the carbon body having at least a substantial amount of the carbon in the form of a continuous skeletal structure may be siliconized is to subject it to contact solely with silicon vapor. This may be done, among other ways, by placing metallic silicon and a body of the above-mentioned carbon structure and density in a container of graphite which is then substantially sealed from the atmosphere. The silicon is contained in a shallow graphite pan or in a recess in the floor of the graphite container, and the carbon body is placed in proximity to, but in such relationship with, the silicon that silicon in the molten state cannot contact it. Usually the carbon body is placed on the floor of the graphite container. However, such methods are not to be preferred over the more simple methods of placing the silicon metal and carbon body in a single closed container where the silicon when molten can come in contact with the base of the carbon body as described earlier above, since the protective coating is not rendered more uniform or of improved quality by the latter method. Furthermore, the reaction chamber would have to be heated considerably above the chamber containing the supply of silicon in order to insure that the supply of silicon vapor therefrom would be superheated when it came in contact with the carbon body.

When silicon carbide that is formed by the processes of the present invention is examined by X-ray diffraction methods, it shows a pattern characteristic of a cubic material, in contradistinction to the pattern of the usual kind of silicon carbide which is hexagonal or trigonal. The structure of the silicon carbide formation, moreover, is reticular, that is, the silicon carbide forms a substantially continuous network or skeletal structure. A small proportion of the silicon carbide formed by the process appears, under the microscope, to have crystallized from a molten magma, for example from a silicon-rich magma.

The protective layers of articles as herein made, in addition to silicon carbide, contain silicon-rich material in the interstices of the silicon carbide network or skeleton and may contain uncombined carbon. A chemical analysis of the protective layer shows that it contains as much as 20% of silicon in addition to that combined with the carbon in the form of silicon carbide.

The silicon-rich material in the interstices of the protective layer apparently is a solid solution of either silicon carbide and silicon or carbon and silicon or a solid solution of all three of these materials, because it has been found that this silicon-rich material has a much higher melting point than that of elemental silicon.

Having described the invention it is desired to claim:

1. An article of manufacture comprising a carbon body having a density of from .7 to 1.1 grams per cubic centimeter and having an integral surface layer of silicon carbide of substantially uniform thickness said silicon carbide having been formed in situ.

2. As a new article of manufacture, a carbon body having a density of from .7 to 1.1 grams per cubic centimeter, the exposed surfaces of which are composed essentially of silicon carbide of cubic crystal form and reticular structure said silicon carbide having been found in situ.

3. A carbon body having an exterior layer of substantially uniform thickness integral with the main carbon body, said main carbon body having a density of from .7 to 1.1 grams per cubic centimeter, said exterior layer being formed in situ and composed essentially of a reticulated structure of crystalline silicon carbide and interstitial silicon.

4. A carbon body having an exterior layer of substantially uniform thickness integral with the main carbon body, said main carbon body having a density of from .7 to 1.1 grams per cubic centimeter, said exterior layer being formed in situ and composed essentially of a reticulated structure of crystalline silicon carbide and interstitial silicon-rich material.

5. A refractory article of manufacture comprising a refractory body having a wear-resistant and oxidation-resistant refractory exterior of essentially crystalline silicon carbide and silicon of substantially uniform thickness formed in situ and integral with a carbon core having a density of from .7 to 1.1 grams per cubic centimeter.

6. As a new article of manufacture a massive body of carbon having a surface layer thereof integral with the main carbon body and of substantially uniform thickness, said main carbon body having a density of from .7 to 1.1 grams per cubic centimeter, said surface layer having been formed in situ and comprising crystalline silicon carbide which is substantially continuous although reticular in structure and has an X-ray pattern characteristic of a cubic material, with a substantial amount of silicon uncombined with carbon in the interstices of said reticular structure.

7. A method of making refractory carbon articles in which the main carbon body thereof is protected by an integral surface layer composed essentially of crystalline silicon carbide and interstitial silicon, the silicon carbide being of reticular structure and having an X-ray pattern characteristic of a cubic material, said method comprising forming a mixture comprising an acid and one of the following group: furfural, furfuryl alcohol, and a mixture of furfural and furfuryl alcohol, allowing the furfural compound and acid to react in a mold of the desired shape to form a dense body composed predominantly of carbon, removing said carbon body from the mold, drying it, and exposing said carbon body to silicon vapors at a temperature in excess of 1800° C. to cause the silicon vapors to react with the surface portions of said carbon body and convert the carbon thereof to a uniform limited depth to crystalline silicon carbide of reticulated structure having the interstices thereof filled with silicon-rich material.

8. A method of making refractory carbon articles in which the main carbon body thereof is protected by an integral surface layer composed essentially of crystalline silicon carbide and interstitial silicon, the silicon carbide being of reticular structure and having an X-ray pattern characteristic of a cubic material, said method comprising forming a mixture comprising finely divided carbon, an acid and one of the following group: furfural, furfuryl alcohol, and a mixture of furfural and furfuryl alcohol, allowing the furfural compound and acid to react in a mold of the desired shape to form a dense body composed predominantly of carbon, removing said carbon body from the mold, drying it, and exposing said carbon body to silicon vapors at a temperature in excess of 1800° C. to cause the silicon vapors to react with the surface portions of said carbon body and convert the carbon thereof to a uniform limited depth to crystalline silicon carbide of reticulated structure having the interstices thereof filled with silicon-rich material.

9. A method of making refractory carbon articles in which the main carbon body thereof is protected by an integral surface layer composed essentially of crystalline silicon carbide and interstitial silicon, the silicon carbide being of reticular structure and having an X-ray pattern characteristic of a cubic material, said method comprising reacting in a mold of the desired shape 65-80 parts by volume of one of the following group: furfural, furfuryl alcohol, and mixtures of furfural and furfuryl alcohol, with a mineral acid which is equivalent to 35-20 parts by volume of hydrochloric acid of concentrated grade containing 35% HCl, and including in said reaction mixture .4 to .9 of a gram of finely divided carbon per cubic centimeter of the mixture, to form a dense carbon body of the desired shape and density, removing said carbon body from the mold and exposing said carbon body to silicon vapors at a temperature in excess of 1800° C. to cause the silicon vapors to react with the surface portions of said carbon body and convert the carbon thereof to a uniform limited depth to crystalline silicon carbide of reticulated structure having the interstices thereof filled with silicon-rich material.

10. A method of making refractory carbon articles in which the main carbon body thereof is protected by an integral surface layer composed essentially of crystalline silicon carbide and interstitial silicon, the silicon carbide being of reticular structure and having an X-ray pattern characteristic of a cubic material, said method comprising reacting in a mold of the desired shape 65-80 parts by volume of one of the following group: furfural, furfuryl alcohol, and mixtures of furfural and furfuryl alcohol, with a mineral acid which is equivalent to 35-20 parts by volume of hydrochloric acid of concentrated grade containing 35% HCl, removing said carbon body from the mold, drying it, and exposing said carbon body to silicon vapors at a temperature in excess of 1800° C. to cause the silicon vapors to react with the surface portions of said carbon body and convert the carbon thereof to a uniform limited depth to crystalline silicon carbide of reticulated structure having the interstices thereof filled with silicon-rich material.

ALBERT H. HEYROTH.

REFERENCES CITED

The following references are of record in the file of this patent:

UNITED STATES PATENTS

| Number | Name | Date |
| --- | --- | --- |
| 1,653,123 | Rentschler | Dec. 20, 1927 |
| 1,666,936 | Kern | Apr. 24, 1928 |
| 1,742,259 | Kelleher | Jan. 7, 1930 |
| 1,804,361 | Marcin | May 5, 1931 |
| 1,982,012 | Mingard | Nov. 27, 1934 |
| 2,093,390 | Wyckoff | Sept. 14, 1937 |
| 2,356,161 | Ilei | Aug. 22, 1944 |
| 2,443,798 | Moberly | June 22, 1948 |